US012574316B2

(12) United States Patent
Haas et al.

(10) Patent No.: US 12,574,316 B2
(45) Date of Patent: Mar. 10, 2026

(54) ROUTE DISTINGUISHERS FOR SAME DESTINATION PATH DIVERSITY

(71) Applicant: Juniper Networks, Inc., Sunnyvale, CA (US)

(72) Inventors: Jeffrey Haas, Ypsilanti, MI (US); Richard Roberts, Rennes (FR)

(73) Assignee: Juniper Networks, Inc., Sunnyvale, CA (US)

( * ) Notice: Subject to any disclaimer, the term of this patent is extended or adjusted under 35 U.S.C. 154(b) by 321 days.

(21) Appl. No.: 18/345,887

(22) Filed: Jun. 30, 2023

(65) Prior Publication Data

US 2025/0007821 A1 Jan. 2, 2025

(51) Int. Cl.
| | |
|---|---|
| *H04L 45/24* | (2022.01) |
| *H04L 12/46* | (2006.01) |
| *H04L 45/586* | (2022.01) |
| *H04L 45/745* | (2022.01) |

(52) U.S. Cl.
CPC .......... *H04L 45/24* (2013.01); *H04L 12/4641* (2013.01); *H04L 45/586* (2013.01); *H04L 45/745* (2013.01)

(58) Field of Classification Search
None
See application file for complete search history.

(56) References Cited

U.S. PATENT DOCUMENTS

| | | | | |
|---|---|---|---|---|
| 11,115,309 | B1 * | 9/2021 | Scholl | ...................... H04L 43/12 |
| 2002/0191541 | A1 * | 12/2002 | Buchanan | ........... H04L 63/0263 |
| | | | | 370/230 |

| | | | | |
|---|---|---|---|---|
| 2007/0226630 | A1 | 9/2007 | Farid et al. | |
| 2008/0031157 | A1 * | 2/2008 | Tamboise | ................ H04L 45/50 |
| | | | | 370/254 |
| 2008/0267187 | A1 * | 10/2008 | Kulmala | ............. H04L 12/4641 |
| | | | | 370/392 |
| 2018/0091420 | A1 * | 3/2018 | Drake | ................... H04L 45/033 |
| 2022/0321382 | A1 | 10/2022 | Sridhar et al. | |
| 2024/0007400 | A1 | 1/2024 | Cao | |

FOREIGN PATENT DOCUMENTS

| | | | |
|---|---|---|---|
| WO | 2013184846 | A1 | 12/2013 |
| WO | 2022193696 | A1 | 9/2022 |

OTHER PUBLICATIONS

Bates et al., "Multiprotocol Extensions for BGP-4", Network Working Group, Jan. 1, 2007, 12 pp., URL: https://www.rfc-editor.org/rfc/pdfrfc/rfc4760.txt.pdf.

(Continued)

*Primary Examiner* — Xavier S Wong

(74) *Attorney, Agent, or Firm* — Shumaker & Sieffert, P.A.

(57) ABSTRACT

This disclosure describes techniques for using multiple route distinguishers assigned to a single VRF to provide same-destination path diversity in a VPN. In an example, a method includes storing, by a device, to a single virtual routing and forwarding instance (VRF) of one or more VRFs configured for a network device of a network, a plurality of routes for a common address prefix of a virtual private network (VPN); and sending, by the device to a network router, each of the plurality of routes for the common address prefix with a different, corresponding route distinguisher.

18 Claims, 7 Drawing Sheets

(56) References Cited

OTHER PUBLICATIONS

Hopps et al., "Analysis of an Equal-Cost Multi-Path Algorithm", Network Working Group, Nov. 1, 2000, 8 pp., URL: https://www.rfc-editor.org/rfc/rfc2992.html.

Juniper, "BGP User Guide", Jun. 13, 2023, 2523 pp., URL: https://www.juniper.net/documentation/us/en/software/junos/bgp/index.html.

Mackie et al., "BGP-Signaled End-System IP/VPNs", Network Working Group, Dec. 15, 2016, 31 pp., URL: https://datatracker.Ietf.org/doc/html/draft-Ietf-I3vpn-end-system.

Rosen et al., "BGP/MPLS IP Virtual Private Networks (VPNs)", Network Working Group, Feb. 1, 2006, 47 pp., URL: https://www.rfc-editor.org/rfc/pdfrfc/rfc4364.txt.pdf.

Walton et al., "Advertisement of Multiple Paths in BGP", Internet Engineering Task Force (IETF), Jul. 1, 2016, 8 pp., URL: https://www.rfc-editor.org/rfc/rfc7911.html.

Extended Search Report from counterpart European Application No. 23200206.3 dated Feb. 19, 2024, 9 pp.

Response to Extended Search Report dated Feb. 19, 2024, from counterpart European Application No. 23200206.3 filed Jun. 18, 2025, 18 pp.

* cited by examiner 123.123.123.123/32

CE1
48A

CE2
48E 123.123.123.123/32

PE1
42A

250

ADVERTISEMENT 153:
1.2.3.4:100:192.168.1.0/24 LBL 100 VIA PE1
1.2.3.4:101:192.168.1.0/24 LBL 200 VIA PE1

VRF A
41

PE2
42B

ROUTING INFORMATION BASE 90

VRF A ROUTES:

192.168.1.0/24 TO PE1 + LBL 100 (= PATH TO CE1)
192.168.1.0/24 TO PE1 + LBL 200 (= PATH TO CE2)

CONFIGURATION DATABASE 91
VRF_A
{
    STATIC ROUTE 192.168.1.0/24 VIA CE1
    STATIC ROUTE 192.168.1.0/24 VIA CE2
    ROUTE-DISTINGUISHER-RANGE 1.2.3.4:100-110
}

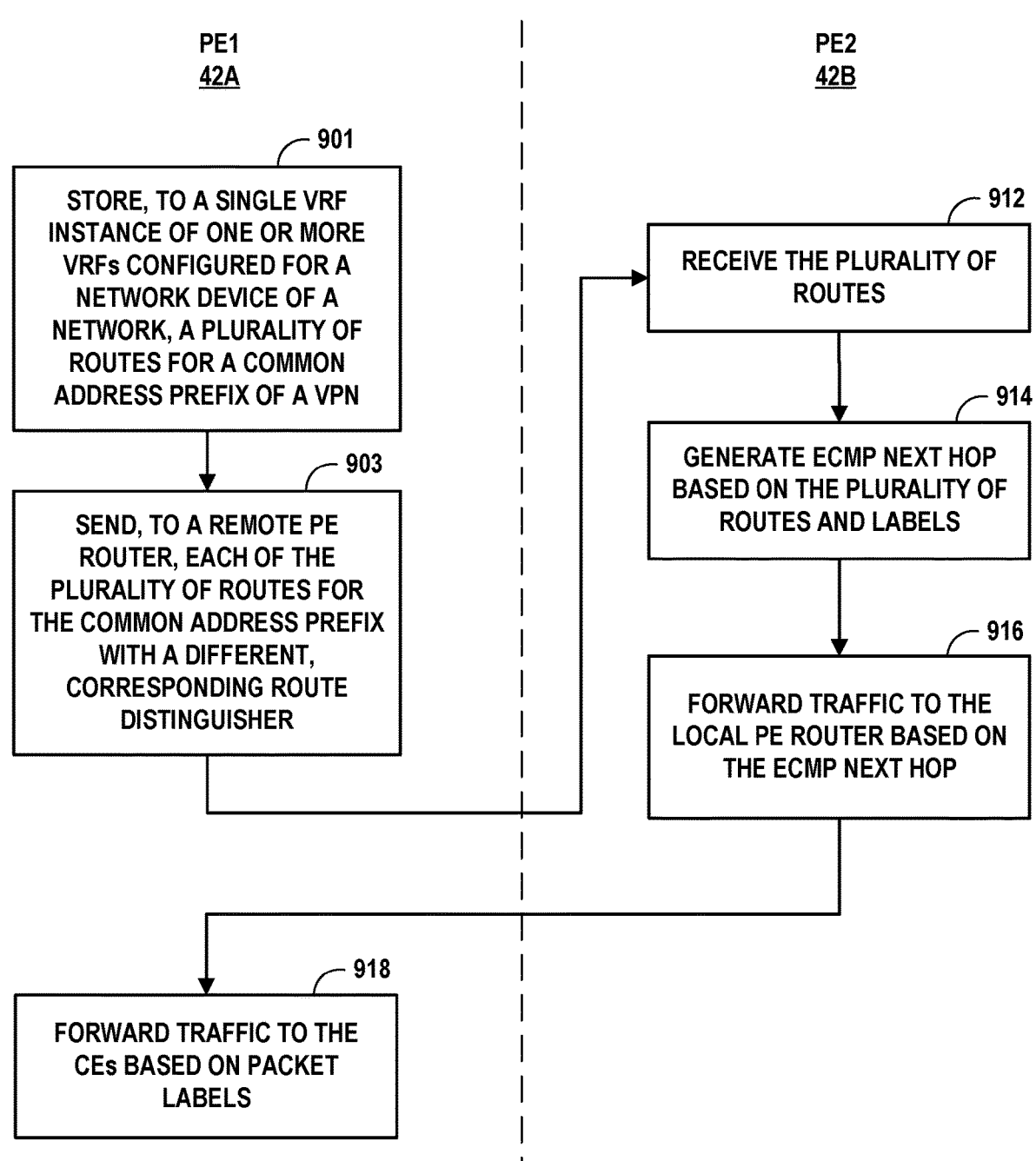

PE1
42A

PE2
42B

901

STORE, TO A SINGLE VRF
INSTANCE OF ONE OR MORE
VRFs CONFIGURED FOR A
NETWORK DEVICE OF A
NETWORK, A PLURALITY OF
ROUTES FOR A COMMON
ADDRESS PREFIX OF A VPN

912

RECEIVE THE PLURALITY OF
ROUTES

903

SEND, TO A REMOTE PE
ROUTER, EACH OF THE
PLURALITY OF ROUTES FOR
THE COMMON ADDRESS PREFIX
WITH A DIFFERENT,
CORRESPONDING ROUTE
DISTINGUISHER

914

GENERATE ECMP NEXT HOP
BASED ON THE PLURALITY OF
ROUTES AND LABELS

916

FORWARD TRAFFIC TO THE
LOCAL PE ROUTER BASED ON
THE ECMP NEXT HOP

918

FORWARD TRAFFIC TO THE
CEs BASED ON PACKET
LABELS

FIG. 7

ROUTE DISTINGUISHERS FOR SAME DESTINATION PATH DIVERSITY

TECHNICAL FIELD

The disclosure relates to computer networks and, more particularly, to packet forwarding within virtual networks.

BACKGROUND

A network or collection of networks, such as those deployed in a data center or service provider network, may employ Internet Protocol-based Virtual Private Networks (VPNs). One example of an IP-based VPN is described more fully in Rosen et al., "BGP/MPLS IP Virtual Private Networks (VPNs)", Request for Comments 4364, Network Working Group, February 2006, the entire contents of which are incorporated by reference herein. Further details of BGP-signaled IP/VPNs are described in S. Mackie et al., "BGP-Signaled End-System IP/VPNs," Network Working Group Internet-Draft, Dec. 15, 2016, the entire contents of which are incorporated by reference herein. Multiprotocol extensions for BGP are described in T. Bates et al., "Multiprotocol Extensions for BGP-4," Request for Comments 4760, Network Working Group, January 2007, the entire contents of which are incorporated by reference herein.

IP addresses imported and exported from Virtual Routing and Forwarding instances (VRFs) used to implement the VPNs can be disambiguated using unique route distinguishers. A route distinguisher may be concatenated with a VPN Internet Protocol (IP) prefix to provide disambiguation of identical prefixes when the same IP prefix is present in different VRFs. Such IP prefixes may be referred to as VPN addresses and, more specifically for IPv4 address, as VPNv4 addresses. For example, the same IPv4 prefix value may pertain to different destinations and be imported to two different virtual routing and forwarding instances (VRFs). Within the context of a single Provider Edge (PE) router, each of these two VRFs can be assigned a unique route distinguisher, so as to permit advertisement of two extended VPNv4 prefixes by the PE router.

SUMMARY

In general, this disclosure describes techniques for using multiple route distinguishers assigned to a single VRF to provide same-destination path diversity in a VPN. As a result, a Provider Edge device (PE) can advertise a prefix within the VRF, for multiple customer edge (CE) devices, using the multiple route distinguishers, to improve load balancing of traffic across the VPN to the CE devices.

In some examples, a same prefix having multiple next hops—each corresponding to one of the CE devices—may be configured or imported as separate routes within a single VRF configured within a PE. The PE may advertise, e.g., using one or more Multi-Protocol Border Gateway Protocol (MP-BGP) messages, each of the corresponding prefixes for the separate routes using a different one of the route distinguishers assigned to the VRF. The prefixes are consequently distinguished and are each assigned and advertised with a different service label, e.g., an MPLS label, for use as a packet label when forwarding from the remote PE that imports the prefixes.

The remote PE that imports the advertised prefix may therefore load balance among the "paths" to the multiple CE devices in the VPN, thereby increasing a path diversity within the VPN. Although packets forwarded by the remote PE using the prefix and assigned service labels may in some cases be forwarded along the same physical path across the network, a local PE that provides reachability to any of the CE devices and receives such a packet will forward the packet to one of the CEs according to the routing entry for the prefix that was advertised together with the particular route distinguisher and service label, which is received with the packet. In some examples, one or more destinations reachable via the CEs (or the CEs themselves) in the VPN are virtual workloads, such as virtual machines or Pods or other container-based endpoints.

The techniques of this disclosure may provide one or more technical advantages that provide a practical application. For example, the techniques improve load balancing, by a remote PE, of traffic across a VPN toward the CE devices. The add-path method implemented by some routers extends MP-BGP to advertise multiple paths using extended NLRIs that include an additional path discriminator ("path-id"). However, the add-path method results in a change to the format of route advertisements and therefore must be understood by all routers that receive or propagate the MP-BGP UPDATE message. Such routers can include ingress and egress PEs, as well as route reflectors. The introduction of add-path for a given Address Family Indicator (AFI)/Subsequent Address Family Indicator (SAFI) therefore disrupts the infrastructure. In a heterogenous network, not all vendors for the PEs may support add-path. In addition, although the need for path diversity may only be beneficial for a small fraction of prefixes being advertised, the use of add-path affects all prefixes of a given SAFI and may cause unwanted side effects due to additional scale stress to the routing information base (RIB) or forwarding information base (FIB). Unlike add-path, the techniques of this disclosure provide path diversity in a VPN in a transparent and less intrusive manner. The use of the techniques may be performed by the egress PE alone, while the ingress PE and route reflector may operate normally. The use of the techniques by a PE may be constrained, in fact, to a single VRF.

In one example aspect, a method includes storing, by a device, to a single VRF of one or more VRFs configured for a network device of a network, a plurality of routes for a common address prefix of a VPN; and sending, by the device to a network router, each of the plurality of routes for the common address prefix with a different, corresponding route distinguisher.

In another example aspect, a controller includes processing circuitry in communication with a memory, the processing circuitry being configured to processing circuitry having access to memory configured with instructions that, when executed, cause the processing circuitry to store, to a single VRF of one or more VRFs configured for a network device of a network, a plurality of routes for a common address prefix of a VPN; and output, to a network router, each of the plurality of routes for the common address prefix with a different, corresponding route distinguisher.

In a further example aspect, a computer-readable storage medium includes instructions that, when executed, cause one or more processors of a controller to store, to a single VRF of one or more VRFs configured for a network device of a network, a plurality of routes for a common address prefix of a VPN; and send, to a network router, each of the plurality of routes for the common address prefix with a different, corresponding route distinguisher.

The details of one or more examples are set forth in the accompanying drawings and the description below. Other features, objects, and advantages will be apparent from the description and drawings, and from the claims.

BRIEF DESCRIPTION OF DRAWINGS

FIG. 7 is a flowchart illustrating example operations of devices, in accordance with the techniques of this disclosure.

Like reference characters denote like elements throughout the figures and text.

DETAILED DESCRIPTION

Figure 1:
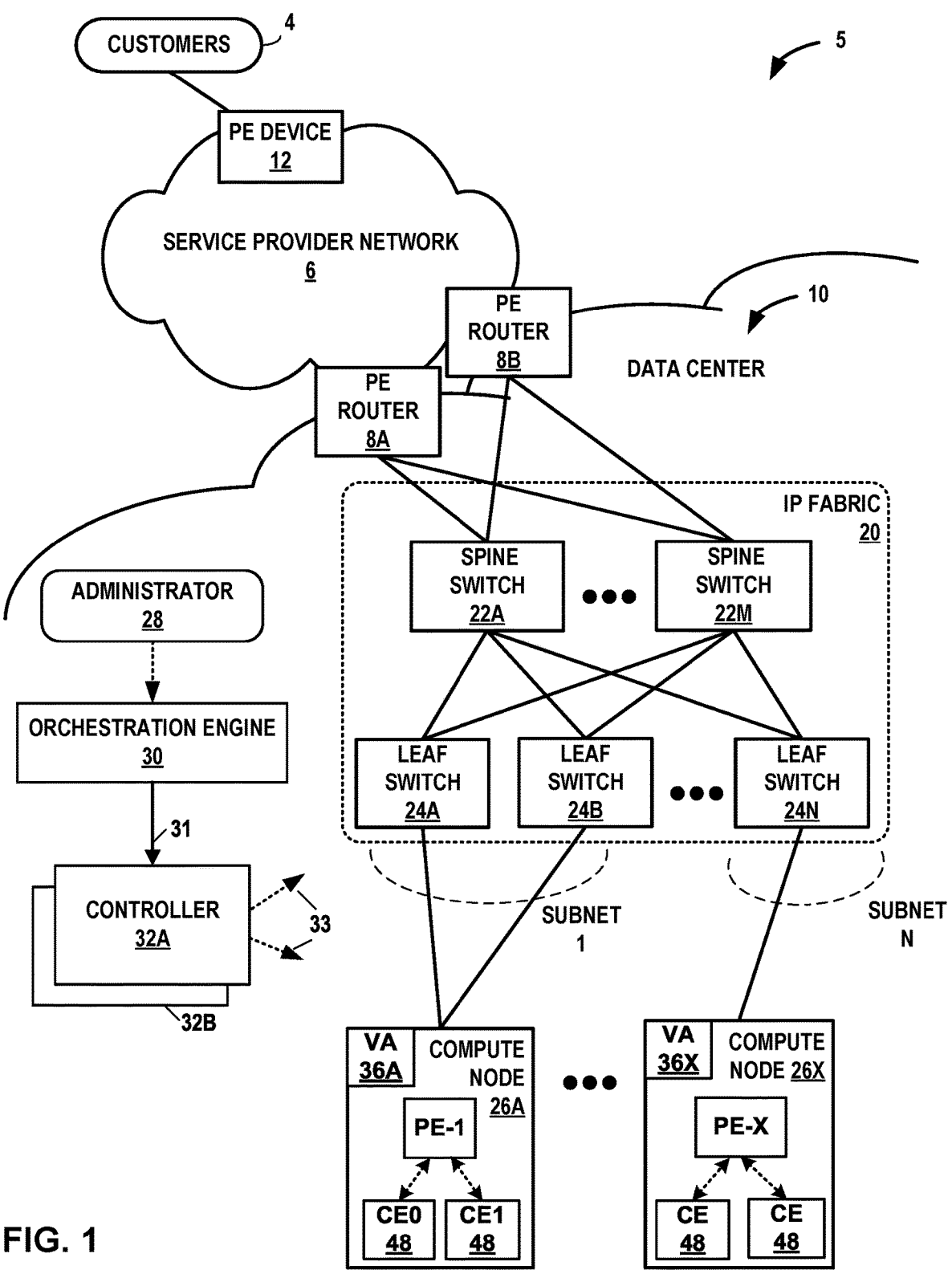
FIG. 1 is a block diagram illustrating an example network system having a data center and in which examples of the techniques described herein may be implemented.

FIG. 1 is a block diagram illustrating an example network system 5 having a data center 10 and in which examples of the techniques described herein may be implemented. In network system 5, controllers 32A-32B ("controllers 32"), compute nodes 26A-26X ("compute nodes 26"), provider edge (PE) routers 8A-8B ("PE routers 8"), and nodes of Internet Protocol (IP) fabric 20 operate in accordance with the techniques described herein to ensure customer traffic flow and customer applications executing within the cloud data center continue without interruption.

In general, data center 10 provides an operating environment for applications and services for customers 4 coupled to the data center 10 by service provider network 6. Customers 4 are coupled to service provider network 6 by provider edge (PE) device 12. Data center 10 hosts infrastructure equipment, such as networking and storage systems, redundant power supplies, and environmental controls. Service provider network 6 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 is a facility that provides network services for customers 4. Customers 4 may be collective entities such as enterprises and governments or individuals. For example, a network data center may host web services for several enterprises and end users. Other example services may include data storage, virtual private networks, traffic engineering, file service, data mining, scientific- or super-computing, and so on. In some examples, data center 10 is an individual network server, a network peer, or otherwise.

In this example, data center 10 includes a set of storage systems and application servers interconnected via an IP fabric 20 provided by one or more tiers of physical network switches and routers. Compute nodes 26 are servers that function as compute nodes of the data center. In some examples, the terms "compute nodes" and "servers" are used interchangeably herein to refer to compute nodes 26. For example, each of compute nodes 26 may provide an operating environment for execution of one or more customer-specific virtual machines ("VMs" in FIG. 1). IP fabric 20 is provided by a set of interconnected leaf switches 24A-24N (collectively, "leaf switches 24") coupled to a distribution layer of spine switches 22A-22M (collectively, "spine switches 22"). Leaf switches 24 may also be referred to as top-of-rack (TOR) switches. Spine switches 22 may also be referred to as spine switches. Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, leaf switches 24 and spine switches 22 provide compute nodes 26 with redundant (multi-homed) connectivity to IP fabric 20. Spine switches 22 aggregate traffic flows and provides high-speed connectivity between leaf switches 24. Leaf switches 24 are network devices that provide layer two (e.g., MAC) and/or layer 3 (e.g., IP) routing and/or switching functionality. Leaf switches 24 and spine switches 22 each include one or more processors and a memory, and that are capable of executing one or more software processes. PE routers 8, also referred to as gateway routers, are routing devices that perform layer 3 routing to route network traffic between data center 10 and customers 4 by service provider network 6. PE routers 8 provide redundant gateways to forward and receive packets between IP fabric 20 and service provider network 6.

Controller 32A is a network controller (e.g., an SDN controller) that provides a logically, and in some cases physically, centralized controller for facilitating operation of one or more virtual networks within data center 10 in accordance with one or more examples of this disclosure. The terms controller and Virtual Network Controller ("VNC") may be used interchangeably throughout this disclosure. In some examples, controller 32A operates in response to configuration input received from orchestration engine 30 via northbound Application Programming Interface (API) 31, which in turn operates in response to configuration input received from administrator 28. Additional information regarding controller 32A operating in conjunction with other devices of data center 10 or other software-defined network is found in International Application Number PCT/US2013/044378, filed Jun. 5, 2013, and entitled PHYSICAL PATH DETERMINATION FOR VIRTUAL NETWORK PACKET FLOWS, which is incorporated by reference as if fully set forth herein.

In some examples, orchestration engine 30 manages functions of data center 10 such as compute, storage, networking, and application resources. For example, orchestration engine 30 may create a virtual network for a tenant within data center 10 or across data centers. Orchestration engine 30 may attach virtual machines (VMs) to a tenant's virtual network. Orchestration engine 30 may connect a tenant's virtual network to some external network, e.g. the Internet or a VPN. Orchestration engine 30 may implement a security policy across a group of VMs or to the boundary of a tenant's network. Orchestration engine 30 may deploy a network service (e.g. a load balancer) in a tenant's virtual network.

In some examples, controller 32A manages the network and networking services such load balancing, security, and allocating resources from compute nodes 26 to various applications via southbound API 33. That is, southbound API 33 represents a set of communication protocols utilized by controller 32A to make the actual state of the network equal to the desired state as specified by orchestration engine 30. One such communication protocol may include a messaging protocol such as Extensible Messaging and Presence Protocol (XMPP), for example. For example, controller 32A implements high-level requests from orchestration engine 30 by configuring physical switches, e.g., leaf switches 24, spine switches 22; physical routers; physical service nodes such as firewalls and load balancers; and virtual services such as virtual firewalls in a VM. Controller 32A maintains routing, networking, and configuration information within a state database. Controller 32A communicates a suitable subset of the routing information and configuration information from the state database to virtual router (VR) agents 36A-36X ("VA" in FIG. 1) on each of compute nodes 26A-26X.

Compute nodes and control nodes associated with different controllers may be arranged in clusters. A cluster is a group of real and/or virtual servers that form a controller, including control nodes, and compute nodes managed by the controller. For example, as shown in FIG. 1, a system may include two independent controllers 32A and 32B, which may each be associated with a different cluster of servers. In some examples, controller 32B manages a second set of compute nodes (not shown). In other examples, controller 32B manages a subset of compute nodes 26, while controller 32A manages a different, non-overlapping subset of compute nodes 26.

Typically, the traffic between any two network devices, such as between network devices within IP fabric 20 or between compute nodes 26 and customers 4 or between compute nodes 26, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyze one particular multipath routing strategy involving the assignment of flows to bins by hashing packet header fields that sends all packets from a particular network flow over a single deterministic path.

For example, a "flow" can be defined by the five values used in a header of a packet, or "five-tuple," i.e., the protocol, Source IP address, Destination IP address, Source port, and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a MultiProtocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

As described herein, each of compute nodes 26 execute a corresponding virtual router that implements a provider edge router ("PE-1 . . . . PE-X" in FIG. 1) that implements multiple virtual routing and forwarding instances ("VRFs") for corresponding virtual networks within data center 10 and routes the packets to appropriate workloads executing within the operating environment provided by the servers. Packets received by the PE1 router of compute node 26A, for instance, from the underlying physical network fabric may include an outer header to allow the physical network fabric to tunnel the payload or "inner packet" to a physical network address for a network interface of compute node 26 that executes the PE1 router. The outer header may include not only the physical network address of the network interface of the server but also a virtual network identifier such as a Virtual Extensible LAN (VXLAN) tag or MPLS label that identifies one of the virtual networks as well as the corresponding VRFs implemented by the PE1 router or an interface. That is, the MPLS label can map either to a VRF or to an interface. An inner packet includes an inner header having a destination network address that conform to the virtual network addressing space for the virtual network identified by the virtual network identifier. In some aspects, the PE1 router buffers and aggregates multiple tunneled packets received from the underlying physical network fabric prior to delivery to the appropriate VRFs for the packets.

In the example of FIG. 1, controller 32A learns and distributes routing and other information (such as configuration information) to all compute nodes in the data center 10. The virtual agent (VA) 36 running inside the compute node, upon receiving the routing information from controller 32A, typically programs the data forwarding element (virtual router) with the forwarding information. Controller 32A sends routing and configuration information to the VA 36 using a messaging protocol such as XMPP protocol. In XMPP, controllers 32 and agents communicate routes and configuration over the same channel. Controller 32A acts as a messaging protocol client when receiving overlay network routes (virtual routes) from a VA 36, and the VA 36 acts as a messaging protocol server in that case. Conversely, controller 32A acts as a messaging protocol server to the VA 36 as the messaging protocol client when the controller sends routes to the VA 36, including overlay network routes learned from gateways or other compute nodes.

Control nodes of controller 32A may generate and encode route distinguishers for virtual private network addresses. In some examples, the route distinguishers can be generated using physical hardware addresses for compute nodes that host virtual network destinations. Virtual network destinations may be virtual network endpoints that are compute node workloads and may represent virtual machines and/or containers, for instance. For example, in response to receiving a messaging protocol message from a compute node 26 specifying a VPN route, a control node of controller 32A sends, to one or more routing protocol peers, such as PE routers 8, a VPN route to a virtual network destination. Among other fields, the VPN route includes a route distinguisher field having a route distinguisher value, which may be generated by the control node in the example of FIG. 1.

A route distinguisher is an identifier attached to a route, enabling a router to distinguish to which VPN or virtual private LAN service (VPLS) the route belongs. The RD enables the same IP address prefix to be used in different VPNs without having them overlap.

In accordance with techniques of this disclosure, each VRF is not limited to an association with a single route distinguisher but may have one or more unique route distinguishers (RDs) associated with it. A PE (PE-1-PE-X) may advertise a same prefix to different next hops from a single VRF using different RDs. The multiple RDs distinguish the common prefix to the receiving PE and enable it to import multiple routes with the same prefix to a common next hop: the advertising PE. These multiple routes may then be used by the receiving PE to better load balance traffic toward CEs associated with the prefix.

Figure 2:
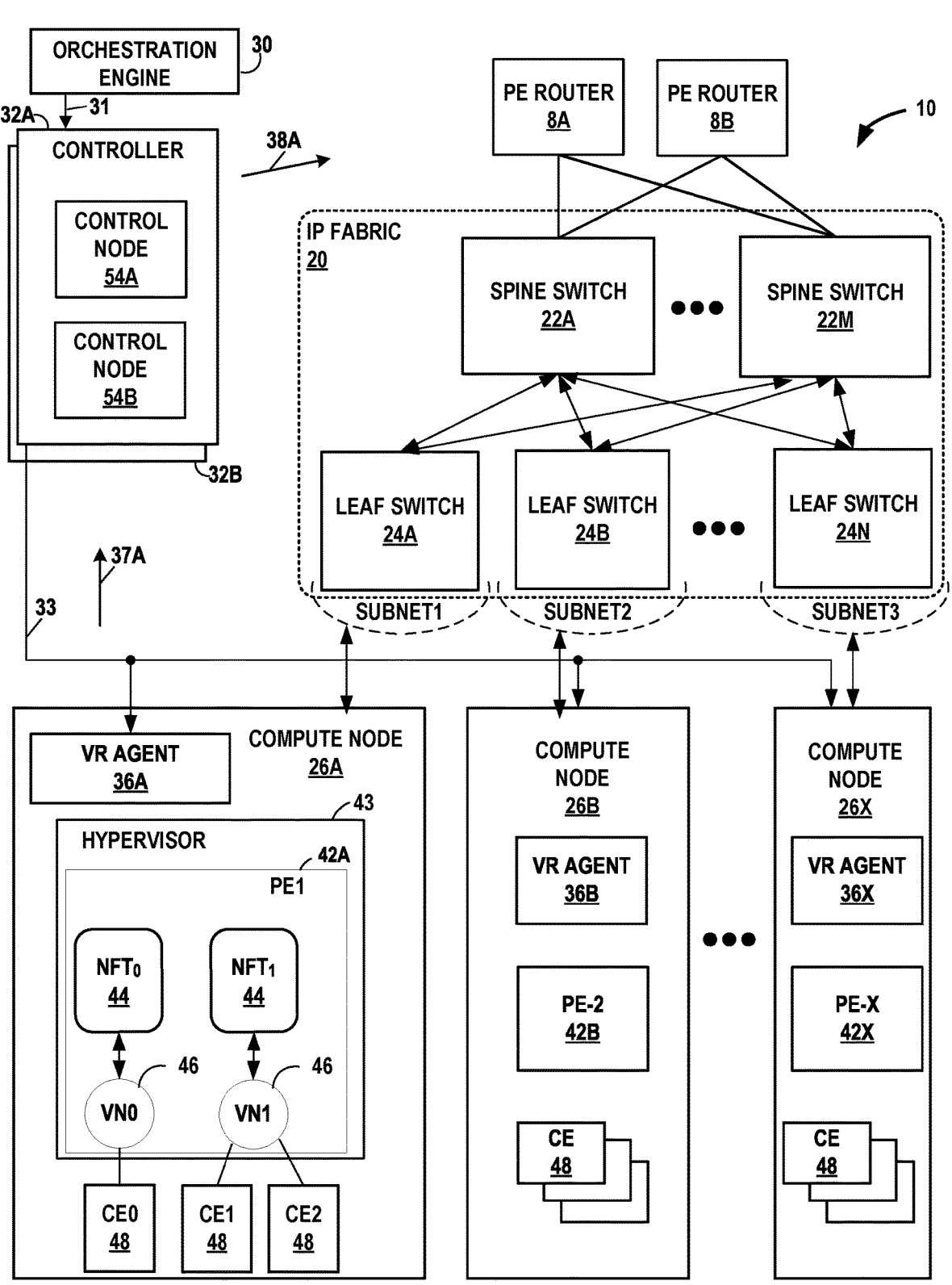
FIG. 2 is a block diagram illustrating an example implementation of the data center of FIG. 1 in further detail, in accordance with the techniques of this disclosure.

FIG. 2 is a block diagram illustrating an example implementation of data center 10 of FIG. 1 in further detail, in accordance with the techniques of this disclosure. In the example of FIG. 2, data center 10 includes compute nodes 26A-26X that includes respective virtual routers that operate as respective provider edge (PE) routers 42A-42X (collectively, "PE routers 42," sometimes referred to as "vrouters" or "virtual routers"). Responsive to instructions received from controller 32A, PE routers 42 dynamically create and manage one or more virtual networks (e.g., "VN1, VN0") 46 usable for communication between application instances.

In one example, PE routers 42 execute the virtual network as an overlay network, which provides the capability to decouple an application's virtual address from a physical address (e.g., IP address) of the one of compute nodes 26A-26X ("compute nodes 26") on which the application is executing. Each virtual network may use its own addressing and security scheme and may be viewed as orthogonal from the physical network and its addressing scheme. Various techniques may be used to transport packets within and across virtual networks 46 over the physical network.

Each of PE routers 42 may execute within a hypervisor, a host operating system, a virtual compute instance such as a virtual machine or container-based instance, a SmartNIC, or other component of each of compute nodes 26. Each of compute nodes 26 may represent an x86 or other general-purpose or special-purpose server capable of executing virtual machines. In the example of FIG. 2, PE router 42A executes within hypervisor 43, also often referred to as a virtual machine manager (VMM), which provides a virtualization platform that allows multiple operating systems to concurrently run on one of compute nodes 26. In the example of FIG. 2, PE router 42A manages virtual networks 46, each of which provides a network environment for execution of one or more customer edge (CE) 48 instances on top of the virtualization platform provided by hypervisor 43. Each CE 48 is associated with one of the virtual networks VN0-VN1 and represents tenant CE workloads running customer applications such as Web servers, database servers, enterprise applications, or hosting virtualized services used to create service chains. In some cases, any one or more of compute nodes 26 or another computing device hosts customer applications directly, i.e., not as virtual machines. Workloads referenced herein, e.g., CEs 48, as well as compute nodes 26, or a separate computing device that hosts a customer application may be referred to alternatively as "hosts."

Each interface of CEs 48 running on the host is connected to a VRF that contains the forwarding tables for the corresponding network that contains the IP address of that interface. The PE router 42 only has VRFs for networks that have interfaces in them on that host, including the Fabric VRF that connects to the physical interface of the host. Virtual networking uses encapsulation tunneling to transport packets between CEs 48 on different hosts, and the encapsulation and decapsulation happens between the Fabric VRF and the VM VRFs.

In general, each of CEs 48 may be any type of workload running a software application and is assigned a virtual address for use within a corresponding virtual network 46, where each of the virtual networks may be a different virtual subnet provided by PE1 router 42A. A CE 48 may be assigned its own virtual layer three (L3) IP address, for example, for sending and receiving communications, but is unaware of an IP address of the physical compute node 26A on which the virtual machine is executing. In this way, a "virtual address" is an address for an application that differs from the logical address for the underlying, physical computer system, e.g., compute node 26A in the example of FIG. 2. The virtual addresses may also be referred to herein as "virtual interfaces."

In one implementation, each of compute nodes 26 includes a corresponding one of VR agents 36A-36X that communicates with controller 32A and, responsive thereto, directs virtual router 42 so as to control the overlay of virtual networks 46 and coordinate the routing of data packets within compute node 26. In general, each VR agent 36 communicates with controller 32A, which generates commands to control routing of packets through data center 10.

VR agents 36 execute in user space and operate as a proxy for control plane messages between CEs 48 and controller 32A. For example, a CE 48 may request to send a message using its virtual address via the VR agent 36A, and VR agent 36A may in turn send the message and request that a response to the message be received for the virtual address of the CE 48 that originated the first message. In some cases, a CE 48 invokes a procedure or function call presented by an application programming interface of VR agent 36A, and the VR agent 36A handles encapsulation of the message as well, including addressing.

In some example implementations, each compute node 26A further includes an orchestration agent (not shown in FIG. 2) that communicates directly with orchestration engine 30. For example, responsive to instructions from orchestration engine 30, the orchestration agent communicates attributes of the particular CEs 48 executing on the respective compute node 26, and may create or terminate individual CEs.

In one example, network packets, e.g., layer three (L3) IP packets or layer two (L2) Ethernet packets generated or consumed by the instances of applications executed by CEs 48 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within PE routers 42, e.g., within the hypervisor or the host operating system running on each of compute nodes 26. As another example, encapsulation and decapsulation functions are performed at the edge of IP fabric 20 at a first-hop top-of-rack (TOR) switch 24 that is one hop removed from the application instance that originated the packet. This functionality is referred to herein as tunneling and may be used within data center 10 to create one or more overlay networks. Besides IP-in-IP, other example tunneling protocols that may be used include IP over GRE, VxLAN, MPLS over GRE, MPLS over UDP, etc.

As noted above, controller 32A provides a logically centralized controller for facilitating operation of one or more virtual networks within data center 10. For example, controller 32A maintains a routing information base, e.g., one or more routing tables that store routing information for the physical network as well as one or more overlay networks of data center 10. Similarly, PE routers 42 maintain routing information, such as one or more routing and/or forwarding tables. In one example implementation, PE router 42A of hypervisor 43 implements a network forwarding table (NFT) 44 for each virtual network 46. In general, each NFT 44 stores forwarding information for the corresponding virtual network 46 and identifies where data packets are to be forwarded and whether the packets are to be encapsulated in a tunneling protocol, such as with a tunnel header that may include one or more headers for different layers of the virtual network protocol stack.

For example, CE1 48 may send an "inner packet," to PE1 router 42A by an internal link. PE1 router 42A uses NFT1 to look up a virtual network destination network address for the packet. NFT1 specifies an outbound interface for PE1 router 42A and encapsulation for the packet. Virtual router 30A applies the encapsulation to add a tunnel header to generate an outer packet and outputs the outer packet on the outbound interface, in this case toward leaf switch 24A.

The routing information, for example, maps packet key information (e.g., destination IP information and other select information from packet headers) to one or more specific next hops within the networks provided by PE routers 42 and IP fabric 20. In some cases, the next hops are chained next hops that specify a set of operations to be performed on each packet when forwarding the packet, such as may be used for flooding next hops and multicast replication. As shown in FIG. 2, each virtual network 46 provides a communication framework for encapsulated packet communications for the overlay network established through IP fabric 20. In this way, network packets associated with any of virtual machines 48 may be transported as encapsulated packet communications via the overlay network.

Each of VR agents 36 may send messages to controller 32A over XMPP sessions, the messages conveying virtual routes to the virtual interfaces (virtual addresses) of the VMs of compute nodes 26. The virtual routes may also be referred to herein as overlay network routes. For example, VR agent 36A sends an XMPP message 37A containing virtual route(s) for compute node 26A. Controller 32A receives the messages and stores the virtual routes to overlay routing information, and may in turn advertise one or more of the virtual routes received from a first VR agent 36 to PE routers 8 (e.g., via Multi-Protocol extensions for BGP (MP-BGP)), such as via route advertisement 38A. MP-BGP is an extension to BGP that allows different address families to be distributed. Controller 32A may also advertise the virtual routes to other control nodes 54, such as to a control node of controller 32B, if there is a gateway router between the two clusters. In some examples, any of the virtual routes may include a prefix, a next hop address associated with a server of compute nodes 26, and a label or other data to identify a virtual routing and forwarding instance configured at the next hop server. A virtual route may also include a route distinguisher (RD).

The route distinguisher is an address qualifier used in the context of IP-VPNs, such as BGP-MPLS VPNs. The route distinguisher is used to distinguish between VPNv4 (alternatively, "VPN-IPv4") routes. The route distinguisher is an 8-byte field. Along with the 4-byte IP address, the route distinguisher forms a 12-byte VPNv4 prefix. The route distinguisher (RD) is an 8-octet value consisting of two major fields, the Type Field (2 octets) and Value Field (6 octets). The type field determines how the value field should be interpreted. The following Types are defined as shown in Table 1:

TABLE 1

| Type number | Value |
| --- | --- |
| Type 0 | 2-byte ASN + 4-byte subfield |
| Type 1 | 4-byte IP + 2-byte subfield |
| Type 2 | 4-byte ASN + 2-byte subfield |

With a type-2 VPN route, at a control node of the SDN controller, the /32 IP address of a VM launched inside a virtual node is added onto the VRF corresponding to the virtual node (VN). The VRF will have the usual attributes like the Route-Target (RT) and Route Distinguisher (RD). With a type-2 VPN route, the control node generates the RD using the IP of the compute node which is a 4-byte IP address and a 2-byte Virtual-Network ID. The VN-ID is sequentially assigned by the config module and is unique across a cluster for every routing instance. VPNv4 routes are typically advertised with Type-1 RD. For example, for a compute node with the IP address being 10.204.217.108, and a VRF with VN ID being 0, the RD generated by the control node would be 10.204.217.108:0. Notwithstanding the above description, RDs may be generated using other schemes.

Every control node of the SDN controller advertises the XMPP routes received from the compute nodes towards other BGP speakers as VPNv4 routes, e.g., route advertisement 38A. The BGP speakers can include other control nodes 54 as well as external BGP speakers such as SDN gateway routers 8.

The SDN architecture described herein supports separation of control-data and management interfaces. It is assumed that the management interfaces are assigned an IP address which is reachable from the outside world and needs to be unique. However, the control-data network is taken from the private addressing space and is local to the cluster. This can be reused across multiple independent clusters.

In response to receiving the route advertisement 38A, PE router 8A, the gateway router, stores the VPN route. PE router 8A may then advertise the route to its routing peers, such as other gateway routers, other controller control nodes, and compute nodes. PE router 8A may forward network traffic in accordance with the stored VPN route. For example, PE router 8A may store the virtual route to a virtual routing and forwarding (VRF) instance for a virtual network that includes the virtual network destination, and forward traffic to the compute node 26A based on the virtual route stored by PE router 8A.

In accordance with techniques of this disclosure, each VRF is not limited to an association with a single route distinguisher but may have one or more unique route distinguishers (RDs) associated with it. A virtual router of any of compute nodes 26 may implement a PE device (e.g., PE-1 42A-PE-X 42X) that may advertise a same prefix to different next hops from a single VRF using different RDs. The multiple RDs distinguish the common prefix to the receiving PE and enable it to import multiple routes with the same prefix to a common next hop: the advertising PE. These multiple routes may then be used by the receiving PE to better load balance traffic toward CEs associated with the prefix.

The architecture of data center 10 illustrated in FIG. 2 is shown for purposes of example only. The techniques as set forth in this disclosure may be implemented in the example data center 10 of FIG. 2, as well as other types of data centers not described specifically herein. Nothing in this disclosure should be construed to limit the techniques of this disclosure to the example architecture illustrated by FIG. 2.

Figure 3:
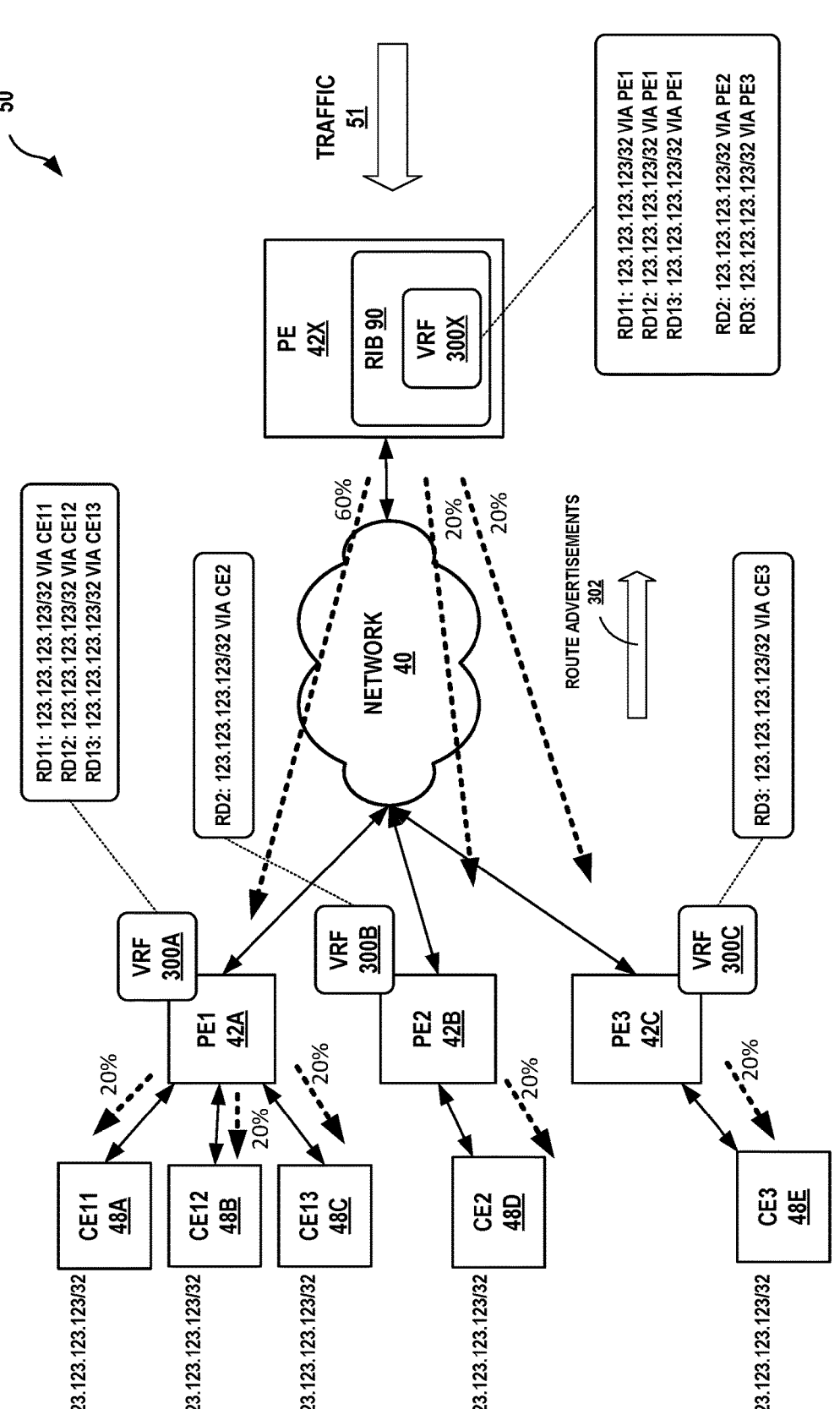
FIG. 3 is a block diagram illustrating an example network system in which examples of the techniques described herein may be implemented.

FIG. 3 is a block diagram illustrating an example network system in which examples of the techniques described herein may be implemented. In some examples described herein, the configuration of network system 50 depicted in FIG. 3 may be used to improve load balancing of traffic across a VPN to each of a plurality of CE devices. Network 40 may represent one or more layer 3 networks and includes PE routers 42 that implement a VPN using respective VRFs 300. Network 40 may represent or include one or more of service provider network, the Internet, a data center network, or another type of network. A local PE1 42A is associated with a VRF 300A, a local PE2 42B is associated with a VRF 300B, and a local PE3 42C is associated with a VRF 300C. A CE11 48A, a CE12 48B, and a CE13 48C are communicatively coupled to local PE1 42A. PE1 42A stores a plurality of routes to the common address prefix for CE11 48A, CE12 48B, and CE13 48C, with respective next hops for CE11 48A, CE12 48B, and CE13 48C. Likewise, a CE2 48D is communicatively coupled to local PE2 42B. Similarly, a CE3 48E is communicatively coupled to local PE3 42C. Local PE1 42A, local PE2 42B, and local PE3 42C are communicatively coupled to the network 40. In the example of FIG. 3, CEs 48A-48E (collectively, "CEs 48") may be any type of customer edge device, such as a CE router or switch, a workload (as described with respect to FIG. 2), a compute node, or other physical or virtual device (such as a virtual machine, container, or other virtual compute instance). CEs 48 have or provide reachability to a common prefix. In the example of FIG. 3, CEs 48 are assigned a common/32 IP address of 123.123.123.123/32. This address may be a virtual IP address and/or may be an anycast IP address, for instance. Traffic destined to this prefix should be forwarded by PEs 48 toward any one or more of CEs 48.

According to the techniques described herein, routes may be advertised from a PE from a same VRF but using different route distinguishers. More specifically, local PE1 42A, local PE2 42B, and local PE3 42C may each output routes, for forwarding traffic to CEs 48, using route advertisements 302 that include multiple unique route distinguishers assigned to a VRF. The prefix advertised by a given one of PEs using multiple route distinguisher may be stored in a single VRF of that PE. For example, local PE 42A may advertise a route of VRF 300A to CE11 48A using a route distinguisher RD11 and an IP address of 123.123.123.123/32. Local PE 42A may also advertise a route of VRF 300A to CE12 48B using a route distinguisher RD12 and the IP address of 123.123.123.123/32; and a route of VRF 300A to CE13 48C using a route distinguisher RD13 and the IP address of 123.123.123.123/32. Likewise, local PE2 42B may advertise a route of VRF 300B via CE2 48D using a route distinguisher RD2 and the IP address of 123.123.123.123/32. Similarly, local PE3 42C may advertise a route of VRF 300C via CE3 48E using a route distinguisher RD3 and the IP address of 123.123.123.123/32.

Route advertisements 302 are sent over network 40 and received at a remote PE 42X. Remote PE 42X is associated with a VRF 300X and is configured to store a routing information base (RIB) 90. RIB 90 may import to VRF 300X a plurality of routes based on route advertisements 302 from PEs 42A-42C, such as the route for RD11: 123.123.123.123/32 via PE1 42A, the route for RD12: 123.123.123.123/32 via PE1 42A, the route for RD 12:123.123.123.123/32 via PE1 42A; the route for RD2: 123.123.123.123/32 via PE2 42B, and the route for R3: 123.123.123.123/32 via PE3 42C.

Thus, multiple route distinguishers may be assigned to a single VRF 300A, 300B, or 300C, to provide same-destination path diversity in a VPN implemented in network 40. A local PE, such as local PE1 42A, local PE2 42B, and/or local PE3 42C, can advertise a prefix within the VRF, for multiple CE devices, using the multiple route distinguishers, to improve load balancing of traffic across the VPN to the CE devices. For example, local PE1 42A can advertise a prefix within the VRF for multiple CE devices including CE 11 48A, CE 12 48B and/or CE 13 48C. In some examples, a same prefix having multiple possible next hops—each corresponding to one of the CE devices CE11 42AB, CE 12 48B or CE 13 48C—may be configured or imported as separate routes within VRF 300A configured within local PE1 42A. Local PE 42A may advertise, e.g., using one or more Multi-Protocol Border Gateway Protocol (MP-BGP) messages, each of the corresponding prefixes for the separate routes using a different one of the route distinguishers assigned to the VRF 300A. The prefixes are consequently distinguished and are each assigned and advertised with a different service label, e.g., an MPLS label, for use as a packet label when forwarding from the remote PE that imports the prefixes. PE2 42B likewise advertises a route to CE2 48D, and PE3 42C likewise advertises a route to CE3 48E.

Remote PE 42X imports the multiple routes, with different route distinguishers for the advertised prefix, based on the one or more of the route advertisements 302 and may therefore load balance traffic 51 among the paths to the multiple CE devices in the VPN, such as CE11 48A, CE12 48B and CE13 48C reachable via PE1 42A, as well as CE2 48D reachable via PE2 42B and CE3 48E reachable via PE3 42C, thereby increasing a path diversity within the VPN. The various routes imported to VRF 300X are shown in FIG. 3. PE 42X may form these routes into an equal-cost multipath (ECMP) route or forwarding entry to the common prefix 123.123.123.123/32 and load balance among the paths according to a load balancing algorithm. Although packets forwarded by the remote PE 42X using the prefix and assigned service labels may in some cases be forwarded along the same physical path across the network 40, a local PE (such as PE1 42A) that provides reachability to any of the CE devices (such as CE11 48A, CE12 48B, and/or CE13 48C) and receives such a packet will forward the packet to one of the CEs according to the routing entry for the prefix that was advertised, together with the particular route distinguisher and service label, which is received with the packet. In some examples, one or more destinations reachable via the CEs (or the CEs themselves) in the VPN are virtual workloads, such as virtual machines or Pods or other container-based endpoints. Advertising the routes with different labels and using the labels for forwarding at the local PEs is described further below with respect to FIG. 5.

In some examples, route distinguishers for VPN addresses are generated to provide for a reusability of an IP address among a plurality of VRFs. In some examples, one or more of the route distinguishers includes a reusable portion that is also mapped to another VRF of the VPN. In some examples, each route distinguisher of the plurality of route distinguishers provides a global disambiguation for each of a plurality of VRFs in the VPN, including the single VRF and the another VRF. In some examples, one or more virtual network destinations in the VPN are virtual workloads.

In a further example, the mapping is performed by specifying a range of route distinguishers for the single VRF. In another further example, the mapping is performed using Network Layer Reachability Information (NLRI). In yet another further example, a CE router initiates the advertising. In yet another further example, the IP address may comprise a physical hardware addresses for a compute node that hosts a virtual network destination.

Each of PEs 42 comprises or is implemented using processing circuitry having access to a memory storing instructions that cause the processing circuitry to implement functionality described above with respect to the PE.

Figure 4:
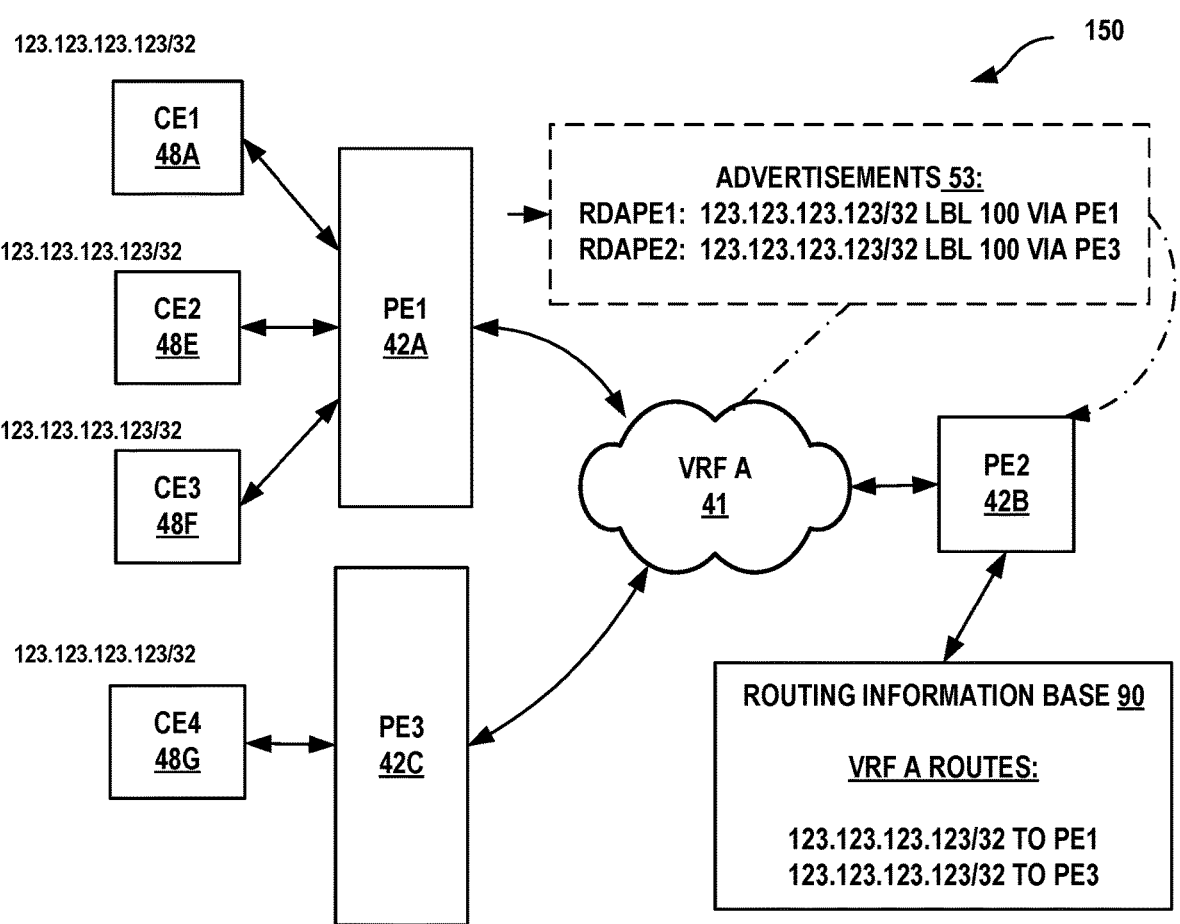
FIG. 4 is a block diagram illustrating an example network system in which examples of the techniques described herein may be implemented.

FIG. 4 is a block diagram illustrating an example network system equipped with virtual routing and forwarding in which examples of the techniques described herein may be implemented. In some examples described herein, the configuration of network system 150 of FIG. 4 may result in sub-optimal or otherwise uneven load balancing of traffic across a VPN to each of a plurality of CE devices. The VPN may be implemented using instances of a VRF A 41 and is depicted as VRF A 41 in FIG. 4. A local PE1 42A, a local PE3 42C, and a remote PE2 42B, are each part of the network and implement a VPN using respective instances of VRF A 41.

In some examples described herein, routes stored to VRFs of multiple PEs may be advertised from PEs using the route distinguishers configured for the different VRFs. For example, local PE1 42A may advertise a route of its VRF instance using a route distinguisher RDAPE1, an IP address of 123.123.123.123/32, and a label of 100, with local PE1 42A as a next hop. Local PE3 42C may advertise a route using a route distinguisher RDAPE2, the IP address of 123.123.123.123/32, and a label of 100, with local PE3 42C as a next hop. Note that the same label of 100 is used in route distinguisher RDAPE1 as well as route distinguisher RDAPE2.

Route advertisements 53 are output via the network and received at remote PE2 42B. Remote PE 42B is configured to store a routing information base (RIB) 90. RIB 90 may include a plurality of routes for VRF A 41, such as 123.123.123.123/32 via PE1 42A, and 123.123.123.123/32 via PE3 42C. In this example, a lack of MP-BGP path diversity may result in a sub-optimal or otherwise uneven load balancing of traffic. For instance, remote PE2 42B may split traffic evenly to PE1 42A and PE3 42C, with 50% being directed to local PE1 42A and 50% being directed to PE3 42C. However, local PE1 42A is communicatively coupled to and provides reachability for three CEs comprising CE1 48A, CE2 48E, and CE3 48F having the common address 123.123.123.123, whereas local PE3 is communicatively coupled to only one CE comprising CE4 48G having the common address 123.123.123.123. Thus, traffic is directed unevenly to the CEs, with 16.67% being directed to CE1 48A, 16.67% being directed to CE2 48E, 16.67% being directed to CE3 48F, and 50% being directed to CE4 48G. In some examples, one or more destinations reachable via the CEs (or the CEs themselves) in the VPN are virtual workloads, such as virtual machines or Pods or other container-based endpoints.

Figure 5:
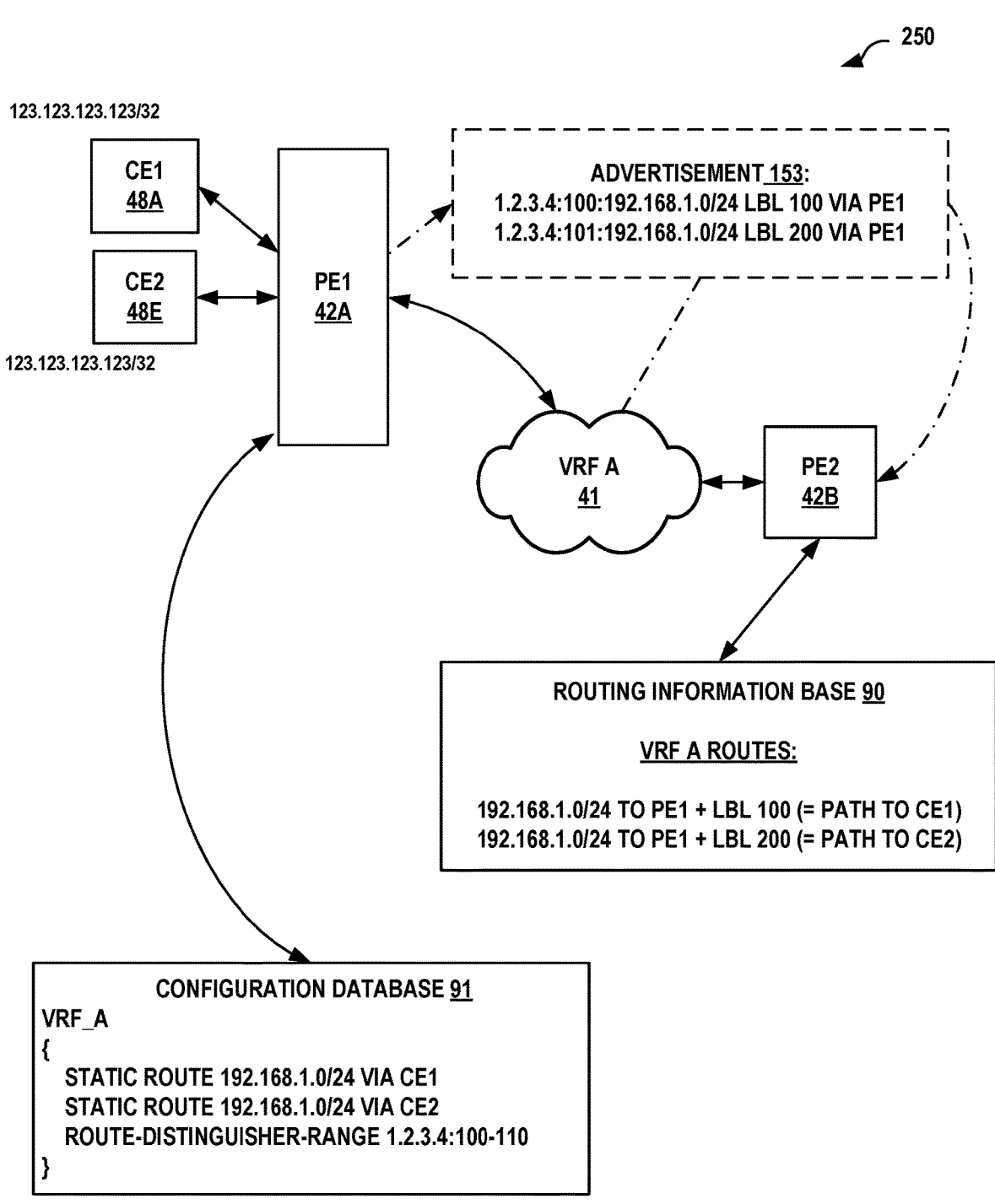
FIG. 5 is a block diagram illustrating another example network system in which examples of the techniques described herein may be implemented.

FIG. 5 is a block diagram illustrating another example network system equipped with virtual routing and forwarding in which examples of the techniques described herein may be implemented. In some examples described herein, the configuration of network system 250 of FIG. 5 may be used to improve load balancing of traffic across a VPN to each of a plurality of CE devices. VRF A 41 of FIG. 5 is similar to VRF A 41 of FIG. 4. A local PE1 42A and a remote PE2 42B, are part of the network and implement a VPN using respective instances of VRF A 41.

In some examples described herein, routes within a same VRF may be advertised from a local PE but using different route distinguishers mapped to that VRF. More specifically, local PE1 42A within VRF A 41 may advertise routes to remote PE2 42B over VRF A 41 using a route advertisement 153 that include unique route distinguishers. For example, local PE1 42A may advertise a route via local PE1 42A using a route distinguisher 1.2.3.4:100:192.168.1.0/24, and including a label of 100. Local PE 42A may also advertise a route via local PE1 42A using a route distinguisher of 1.2.3.4:101:192.168.1.0/24, and including a label of 200. The labels may be MPLS labels. PE1 42A installs forwarding information that maps each label to a different interface. In this example, label 100 is mapped to the interface to CE1 48A, and label 200 is mapped to CE2 48E. The forwarding information may be stored in a label forwarding information base or MPLS table, for instance.

Route advertisement 153 is output on the network and received at remote PE2 42B. Remote PE 42B is configured to store a routing information base (RIB) 90. RIB 90 may include a plurality of routes for VRF A 41, such as 192.168.1.0/24 to PE1 42A including label 100, and 192.168.1.0/24 including label 200 via PE1 42A. Because these routes were advertised by PE1 42A with different route distinguishers for the same prefix, both routes are imported to VRF A of RIB 90 on PE2 42B. PE2 42B load balances traffic to CE1 48A and CE2 48E using the different routes, and by forwarding a packet that is destined to CE1 48A or CE2 48E to PE1 42A with either label 100 or label 200, according to the imported route selected by the load balancing algorithm for that packet (or packet flow). Label 100 is used by PE 42A to direct traffic labeled with label 100 to CE1 48A, whereas label 200 is used by PE 42A to direct traffic labeled with label 200 to CE2 48E. PE 42A pops the label and sends to the appropriate output interface. In this example, these labels (100 and 200) are used to provide MP-BGP path diversity to improve load balancing of traffic among CE1 48A and CE2 48E. For instance, PE2 42B directs 50% of the traffic directed to CE1 48A and 50% of the traffic to CE2 48E. In some examples, one or more destinations reachable via the CEs (or the CEs themselves) in the VPN are virtual workloads, such as virtual machines or Pods or other container-based endpoints.

In the example of FIG. 5, a plurality of route distinguishers are mapped to a single VRF, such as an instance of VRF A 41 for PE 42A. This configuration may be achieved, for example, by providing configuration data in the form of a list of route distinguishers (e.g., route-distinguisher-list 123.123.123.123:100, 123.123.123.123:101, . . . ), a range of route distinguishers (e.g., route-distinguisher 123.123.123.123:100—110—that is, RDs generated from numbers in the range of 100 to 110 appended to an IP address), and/or a predefined maximum number of number of route distinguishers for a VRF (e.g., using a "maximum-per-vrf-route-distinguisher" configuration parameter) when the route distinguishers are auto-generated. As seen above, route-distinguisher-list, route-distinguisher, and maximum-per-vrf-route-distinguisher are all example configuration parameters with which to map multiple RDs to a single VRF. The configuration data may be stored to configuration database 91 for PE1 42A to configure PE1 42A. When advertising routes for a common address prefix, the different, corresponding route distinguisher included in each of the plurality of advertised routes may be drawn from the plurality of route distinguishers specified in the configuration.

Every prefix of a multipath entry (ECMP) can be exported via MP-BGP by allocating each next hop (each CE) using a distinct route distinguisher. Since there may be a predefined maximum number of route distinguishers for a single VRF, the number of next hops may, in some cases, be greater than this maximum. Thus, a route distinguisher can be used to map to several next-hops, for example, using a rotating index. In contrast to the add-path technique described previously, the approach of FIG. 5 uses different route distinguishers instead of a path-id extension. The approach of FIG. 5 provides technical benefits over add-path, as there is no need for infrastructure changes such as MP-BGP peer reconfiguration for add-path support.

Figure 6:
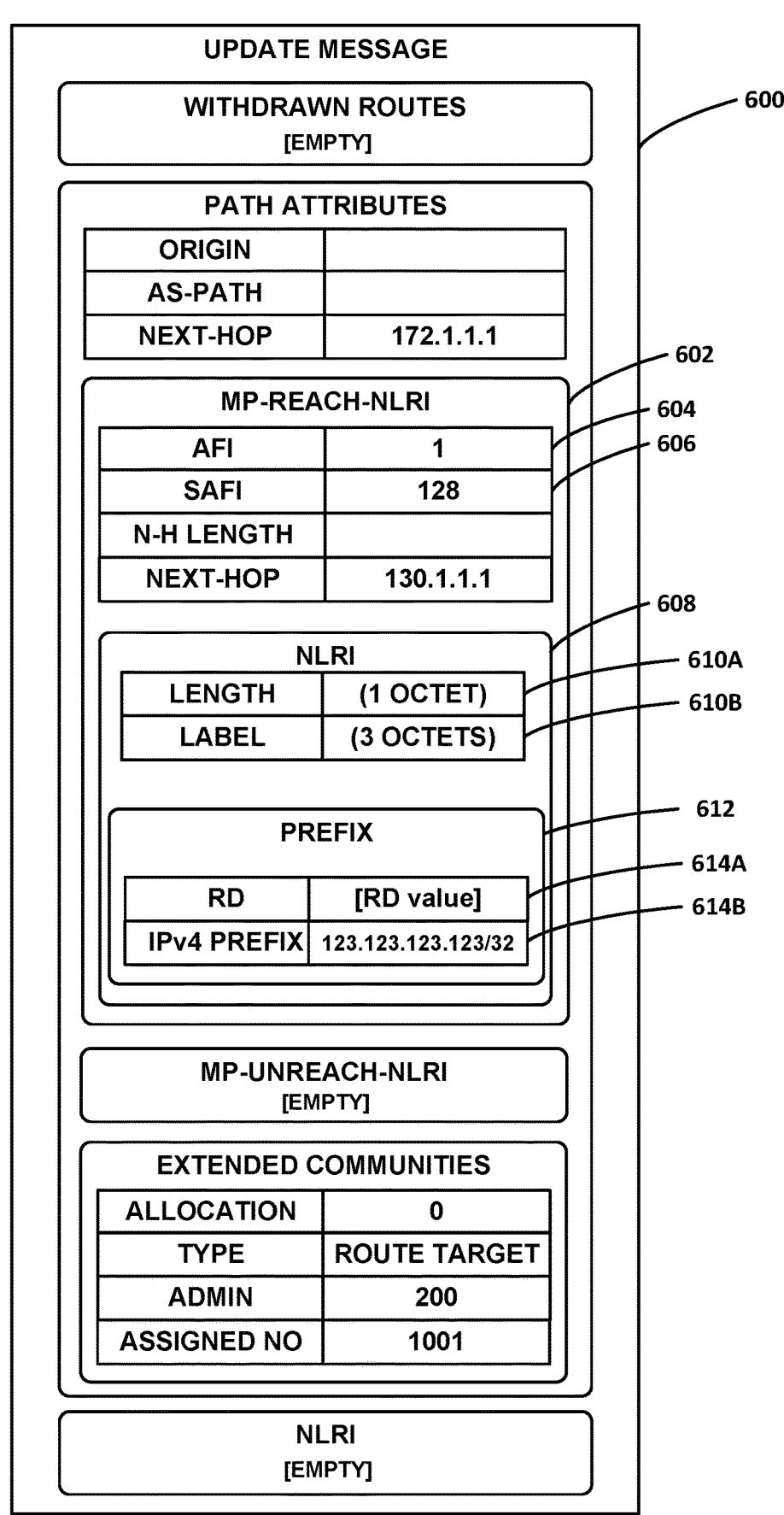
FIG. 6 is a block diagram illustrating an example route advertisement for a virtual private network address that includes a route distinguisher, in accordance with techniques of this disclosure.

FIG. 6 is a block diagram illustrating an example route advertisement for a virtual private network address, in accordance with techniques described herein. In the example of FIG. 6, BGP UPDATE message 600 is a route advertisement that conforms to MP-BGP and includes MP-REACH-NLRI field 602 advertising a CE as reachable via a PE. BGP UPDATE message 600 may represent an example instance of route advertisement 38A illustrated in FIG. 2 or advertisement 153 of FIG. 5. For purposes of illustration, BGP UPDATE message 600 is illustrated using glyphs, rather than with packet fields.

MP-REACH-NLRI field 602 of BGP UPDATE message 600 specifies an Address Family Identifier (AFI) field 604 having a value of 1 in this example to indicate IPv4 network addresses, along with a value for the Subsequent AFI (SAFI) field 606 having a value of 128 to identify the virtual route as a L3VPN route. AFI field 604 and SAFI field 606 may in some instances have different values, as assigned by a private party or by the Internet Assigned Numbers Authority (IANA). In some examples, an IPv6 prefix may be used instead of an IPv4 prefix.

Network Layer Reachability Information (NLRI) field 608 specifies a IP address, identified in prefix field 612. Length field 610A specifies a length of the prefix value in prefix field 612. Label field 610B specifies an MPLS label. Prefix field 612 includes a route distinguisher field 614A that specifies a route distinguisher value. The route distinguisher field 614A may optionally include a Type field having a value that indicates that the Value field of the route distinguisher field 614A is generated based on the multiple RDs assigned to a VRF from which the IPv4 prefix is being advertised/exported. The IPv4 prefix field 614B specifies a value of the IPv4 prefix, in this case 123.123.123.123/32 corresponding to CEs described in various examples elsewhere in this disclosure. A BGP UPDATE message may include multiple instances of NLRI 608, with each NLRI instance specifying same prefix 614B but a different RD value 614A, in accordance with the described techniques.

FIG. 7 is a flowchart illustrating an example operation of devices, in accordance with techniques of this disclosure. The operation is described with respect to example network devices of FIG. 5 but may be performed by other deployments and/or devices. PE1 42A stores, to a VRF, a plurality of routes for a common address prefix (901). Each of the plurality of routes may have different next hops to different CEs attached to the VRF. The VRF may be a single VRF instance of one or more VRFs configured for a network device of a network. PE1 42A generates and outputs each of the plurality of routes for the common address prefix with a different, corresponding route distinguisher, to PE2 42B (903). Such route distinguishers may be selected from a plurality of route distinguishers assigned, configured, or otherwise mapped to the single VRF of PE1 42A. PE1 42A may send the plurality of routes with corresponding route distinguishers to PE2 42B as an advertisement 153. Each of the plurality of routes may also include a different label for packet forwarding.

PE2 42B receives the plurality of routes and corresponding, different route distinguishers (912). PE2 42B generates an ECMP next hop from the plurality of routes (914). Each path for the ECMP next hop may be associated with a different label which, as noted above, may be included with the corresponding route of the plurality of routes. PE2 42B forwards traffic to PE1 42A based on the ECMP next hop, using a load balancing algorithm, such as round-robin (916). In some examples, to forward a given packet on a particular path of the ECMP, PE2 42B appends the label included with the route for that path to the packet and outputs the packet to PE1 42A.

PE1 42A forwards this traffic to one or more CEs (such as CE1 48A and/or CE2 48E) based on packet labels (918).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, process or components may be implemented together or separately as discrete but interoperable logic devices. Depiction of different features as process or units is intended to highlight different functional aspects and does not necessarily imply that such process or units must be realized by separate hardware or software components. Rather, functionality associated with one or more process or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media"

refers to physical storage media, and not signals, carrier waves, or other transient media.

What is claimed is:

1. A device comprising:

processing circuitry having access to memory configured with instructions that, when executed, cause the processing circuitry to:

configure a plurality of route distinguishers for a single virtual routing and forwarding instance (VRF) of one or more VRFs configured for a network device of a network;

store, for the single VRF, a plurality of routes for a common address prefix of a virtual private network (VPN); and output, to a network router, each of the plurality of routes for the common address prefix with a different, corresponding route distinguisher drawn from the plurality of route distinguishers.

2. The device of claim 1, wherein the device comprises one of the network device or a network controller.

3. The device of claim 1, wherein each of the plurality of routes specifies a different next hop for the common address prefix, wherein the next hop indicates an interface of the device.

4. The device of claim 1, wherein to configure the plurality of route distinguishers for the single VRF, the instructions cause the processing circuitry to specify a list that includes the plurality of route distinguishers.

5. The device of claim 1, wherein to configure the plurality of route distinguishers for the single VRF, the instructions cause the processing circuitry to define a range of values for the plurality of route distinguishers.

6. The device of claim 1, wherein to configure the plurality of route distinguishers for the single VRF, the instructions cause the processing circuitry to specify a maximum number of route distinguishers for the single VRF.

7. The device of claim 1, wherein the instructions cause the processing circuitry to execute a virtual router that operates as a provider edge device (PE) for the network.

8. The device of claim 1, wherein the device comprises the network device, and wherein the network device operates as a provider edge device (PE) for the network.

9. The device of claim 1, wherein the instructions cause the processing circuitry to:

receive a packet forwarded to the device according to a first route of the plurality of routes; and forward the packet to a next hop specified by the first route.

10. A method comprising:

configuring a plurality of route distinguishers for a single virtual routing and forwarding instance (VRF) of one or more VRFs configured for a network device of a network;

storing, by a device, for the single VRF, a plurality of routes for a common address prefix of a virtual private network (VPN); and outputting, by the device to a network router, each of the plurality of routes for the common address prefix with a different, corresponding route distinguisher drawn from the plurality of route distinguishers.

11. The method of claim 10, wherein the device comprises one of the network device or a network controller.

12. The method of claim 10, wherein each of the plurality of routes specifies a different next hop for the common address prefix, wherein the next hop indicates an interface of the device.

13. The method of claim 10, wherein the configuring comprises providing a list that includes the plurality of route distinguishers.

14. The method of claim 10, wherein the configuring comprises defining a range of values for the plurality of route distinguishers.

15. The method of claim 10, wherein the configuring comprises providing at least one pre-defined route distinguisher.

16. The method of claim 10, wherein the device comprises the network device, and wherein the network device operates as a provider edge device (PE) for the network.

17. The method of claim 10, further comprising receiving a packet forwarded to the device according to a first route of the plurality of routes; and forwarding the packet to a next hop specified by the first route.

18. Non-transitory computer-readable media comprising instructions that, when executed, cause processing circuitry to:

configure a plurality of route distinguishers for a single virtual routing and forwarding instance (VRF) of one or more VRFs configured for a network device of a network;

store, for the single VRF, a plurality of routes for a common address prefix of a virtual private network (VPN); and output, to a network router, each of the plurality of routes for the common address prefix with a different, corresponding route distinguisher drawn from the plurality of route distinguishers.

* * * * *